US011200556B2

(12) United States Patent
Cathro

(10) Patent No.: US 11,200,556 B2
(45) Date of Patent: Dec. 14, 2021

(54) METHOD AND DEVICE FOR RETRIEVING SECURED TERMINAL LOG DATA

(71) Applicant: NCR Corporation, Duluth, GA (US)

(72) Inventor: Ian Alexander Cathro, Scotland (GB)

(73) Assignee: NCR Corporation, Atlanta, GA (US)

( * ) Notice: Subject to any disclaimer, the term of this patent is extended or adjusted under 35 U.S.C. 154(b) by 1759 days.

(21) Appl. No.: 14/744,737

(22) Filed: Jun. 19, 2015

(65) Prior Publication Data

US 2016/0371675 A1  Dec. 22, 2016

(51) Int. Cl.
*G06Q 40/00* (2012.01)
*G06Q 20/32* (2012.01)
*G06Q 20/10* (2012.01)
*G07F 19/00* (2006.01)

(52) U.S. Cl.
CPC ..... *G06Q 20/3224* (2013.01); *G06Q 20/1085* (2013.01); *G06Q 20/3221* (2013.01); *G06Q 20/3223* (2013.01); *G07F 19/207* (2013.01); *G07F 19/209* (2013.01)

(58) Field of Classification Search
CPC .. G06Q 20/32; G06Q 20/401; G06Q 30/0267; G06Q 50/188
USPC ............... 705/50, 39, 38, 37, 35; 709/227; 719/328, 108; 715/704; 726/9, 6
See application file for complete search history.

(56) References Cited

U.S. PATENT DOCUMENTS

| | | | |
|---|---|---|---|
| 9,098,312 B2* | 8/2015 | Bullotta | G06F 9/451 |
| 2006/0212407 A1* | 9/2006 | Lyon | G06Q 20/4016 |
| | | | 705/71 |
| 2009/0132813 A1* | 5/2009 | Schibuk | G06Q 20/322 |
| | | | 713/158 |
| 2010/0136943 A1* | 6/2010 | Hirvela | H04W 4/00 |
| | | | 455/404.1 |
| 2012/0268241 A1* | 10/2012 | Hanna | G06F 21/32 |
| | | | 340/5.52 |

(Continued)

OTHER PUBLICATIONS

IEEE Guide for Smart Grid Interoperability of Energy Technology and Information Technology Operation with the Electric Power System (EPS), End-Use Applications, and Loads; IEEE Std 2030-2011 (pp. 1-126); Nov. 7, 2011 Publication Date: Sep. 10, 2011; Electronic Publication Date: Nov. 4, 2013 . . . (Year: 2011).*

*Primary Examiner* — Tien C Nguyen
(74) *Attorney, Agent, or Firm* — Schwegman, Lundberg & Woessner

(57) ABSTRACT

A mobile device, such as a cellular phone, can retrieve log data from a secured terminal, such as an automated teller machine. The mobile device can download data including a log from a secured terminal through a connection established therebetween, such as through a wired port on the secured terminal. The mobile device can determine a data representation of a geographic location of the secured terminal determined from at least one of a positioning service and a positioning device, such as from a global positioning system module of the mobile device. The mobile device can automatically upload data including the log and the geographic location to at least one server via a network, such as a wireless 3G network. The at least one server can select the closest secured terminal to the first geographic location, based on a database of known, stored locations of secured terminals.

20 Claims, 3 Drawing Sheets

(56) References Cited

U.S. PATENT DOCUMENTS

2013/0080898 A1\* 3/2013 Lavian ...................... G06F 3/16
715/728
2014/0339301 A1\* 11/2014 Angus .................... G07D 11/30
235/379

\* cited by examiner

US 11,200,556 B2

METHOD AND DEVICE FOR RETRIEVING SECURED TERMINAL LOG DATA

BACKGROUND

A secured terminal, such as an automated teller machine, a self-service checkout terminal, or a cash kiosk, can produce logs. The logs can provide details regarding the performance of the secured terminal, which can include a list of transactions performed at the secured terminal, operating conditions of the secured terminal, details and operating conditions at which a transaction failed at the secured terminal, and other suitable details.

SUMMARY

A method is discussed for retrieving secured terminal log data. A mobile device can download data including a first log from a first secured terminal through a connection established between the mobile device and the first secured terminal. The mobile device can determine a data representation of a first geographic location of the first secured terminal determined from at least one of a positioning service and a positioning device. The mobile device can automatically upload data including the first log and the first geographic location to at least one server via a network. In this manner, the first log can be transferred from the first secured terminal, to the mobile device, to the at least one server.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

An owner or operator of a secured terminal can use logs generated by the secured terminal to assess a health of the secured terminal, and/or diagnose problems with the secured terminal. In some cases, for security reasons, the secured terminals may not be configured to provide the logs remotely. For these cases, a field engineer or technician can visit the secured terminal, and can retrieve the logs in person.

In some examples, the field engineer or technician can retrieve log data from the secured terminal onto a cellular phone or other suitable mobile device. In some examples, the cellular phone can determine its location, through a global positioning system module or other suitable device or service. In some examples, the cellular phone can upload the log data and the location to a server. In some examples, the server can access a database of locations of installed secured terminals, can identify a secured terminal nearest to the uploaded location, and can match the log data to the identified secured terminal.

One potential advantage to retrieving the logs in this manner is the server can identify geography-specific problems, based on the uploaded locations. For instance, the server may determine that be able to identify an issue with a particular country's paper currency, which causes automated teller machines to jam frequently in the particular country but jam less frequently in other countries. This is but one potential advantage; there can be other advantages as well.

Figure 1:
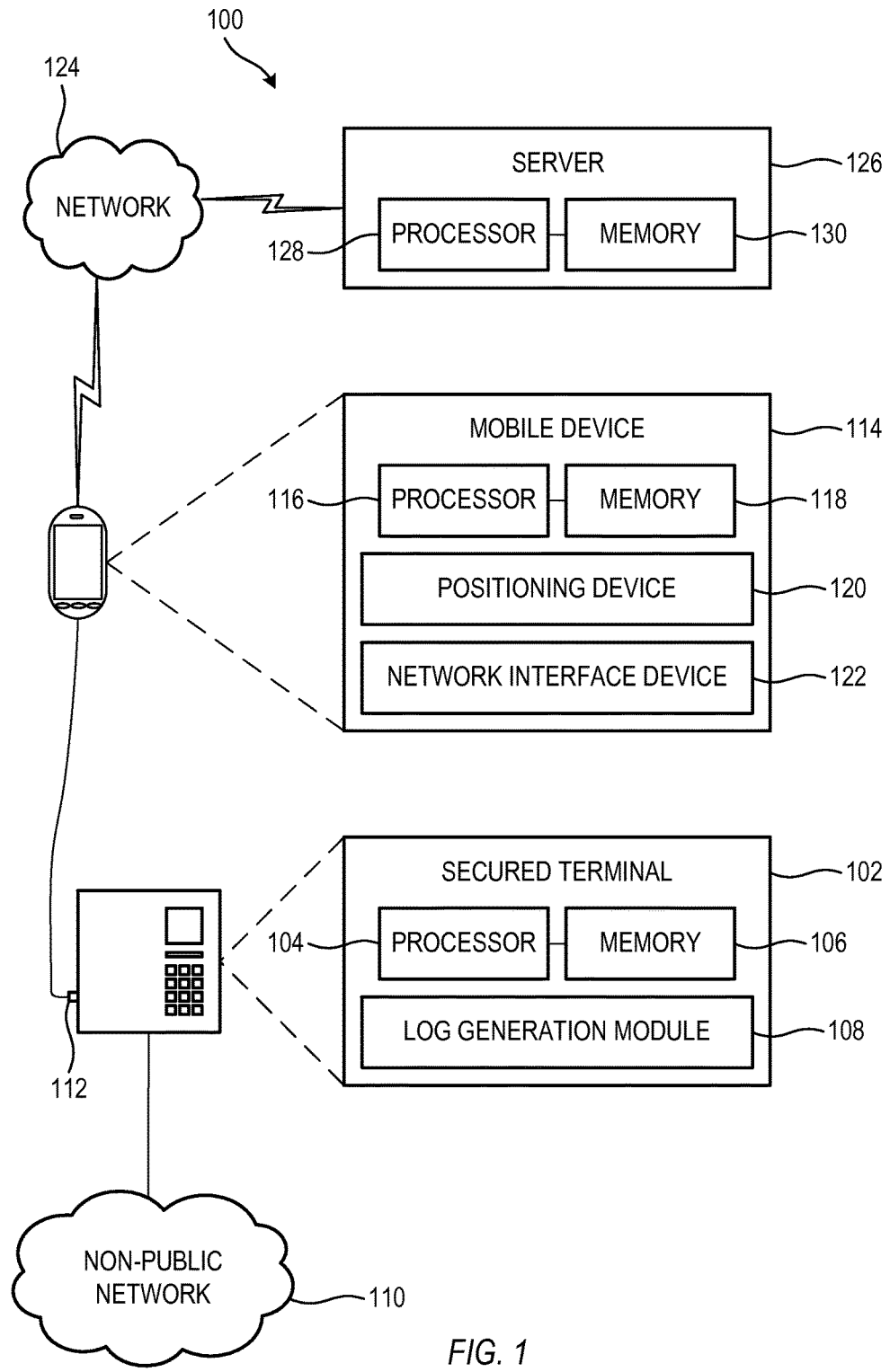
FIG. 1 shows an example of a system for retrieving secured terminal log data, in accordance with some embodiments.

FIG. 1 shows an example of a system 100 for retrieving secured terminal log data, in accordance with some embodiments. The system 100 of FIG. 1 is but one example of such a system; other systems can also be used.

System 100 can include one or more secured terminals 102. Examples of a suitable secured terminal 102 can include an automated teller machine, a self-service checkout station, a cash kiosk, and others. For clarity, FIG. 1 shows only a single secured terminal 102; in practice, there can be a network of secured terminals, operating in one or more geographic regions in a city, state, country, or worldwide.

Secured terminal 102 can include at least one processor 104. For clarity, FIG. 1 shows only a single processor 104, but it will be readily understood that the secured terminal 102 can alternatively include multiple processors 104, and that data processing activities can be divided as needed among one or more of the processors 104.

Secured terminal 102 can include at least one memory device 106 storing instructions executable by the at least one processor 104. For clarity, FIG. 1 shows only a single memory device 106, but it will be readily understood that the secured terminal 102 can alternatively include multiple memory devices 106, and that storage functions can be divided as needed among one or more of the memory devices 106. The instructions can be executable by the at least one processor 104 to perform data processing activities.

Secured terminal 102 can include a log generation module 108, which generates, updates, and stores operational and performance logs that include transactional details, operating conditions of the secured terminal 102, details regarding failed transactions, and other suitable information. The log generation module 108 can be configured in software, in hardware, or in a combination of software and hardware in the secured terminal 102.

During operation of the secured terminal 102, the at least one processor 104 and at least one memory device 106 communicate with a non-public network 110, which can be secured, and can therefore be inaccessible to a field engineer or technician associated with the secured terminal 102. In some examples, the network 110 can be a public network, which can be unsecured. For instance, for examples in which the secured terminal 102 is an automated teller machine, the non-public network 110 can be run by a bank, credit union, or other financial institution. In some examples, the secured terminal 102 connects to the non-public network 110 via a wireless connection with suitable security protocols. In some examples, the secured terminal 102 connects to the non-public network 110 via a wired connection with suitable security protocols. In some examples, the secured terminal 102 is connected to the non-public network 110 via a wired connection and is not connected to a wireless network. For security reasons, such a non-public network 110 is not suitable for retrieving log data from the secured terminal 102.

As a result, a field engineer or technician can retrieve a log from the secured terminal 102 by another connection 112, separate from the non-public network 110. In some examples, such as the example of FIG. 1, the connection 112 can include a wired port on the secured terminal 102. Examples of suitable wired ports can include universal serial bus, high-definitional multimedia interface, and others. In other examples, the connection 112 can include a wireless connection to and from the secured terminal 102.

A field engineer or technician can retrieve a log from the secured terminal with a mobile device 114. Examples of a suitable mobile device 114 can include a cellular telephone, a smart phone, a laptop computer, and others.

Mobile device 114 can include at least one processor 116. For clarity, FIG. 1 shows only a single processor 116, but it will be readily understood that the mobile device 114 can alternatively include multiple processors 116, and that data processing activities can be divided as needed among one or more of the processors 116.

Mobile device 114 can include at least one memory device 118 storing instructions executable by the at least one processor 116. For clarity, FIG. 1 shows only a single memory device 118, but it will be readily understood that the mobile device 114 can alternatively include multiple memory devices 118, and that storage functions can be divided as needed among one or more of the memory devices 118. The instructions can be executable by the at least one processor 116 to perform data processing activities.

Mobile device 114 can include a positioning device 120 that can determine a data representation of a geographic location of the mobile device 114. In some examples, the data representation can include longitude and latitude coordinates indicating the position of the mobile device 114. In other examples, other suitable coordinate systems can also be used. In some examples, the positioning device 120 can be a global positioning system module of the mobile device 114. There can be instances when a global positioning system module fails to determine the location, such as when a signal is unavailable or obscured by structures, such as buildings. When the global positioning system module fails, the mobile device 114 can use other suitable positioning devices and/or positioning services to determine its location. For instance, mobile device 114 can access a particular wireless access point or network that can have a known location, so that an online service, such as Google, can recognize that the mobile device 114 is proximate the known location of the wireless access point or network. As another example, the mobile device 114 can use triangulation with cell towers to determine its location. As still another example, the mobile device can use a beacon device, such a Bluetooth device, to determine its location. Other suitable positioning devices and/or positioning services can also be used.

Mobile device 114 can include a network interface device 122 that can connect the mobile device to a network 124. In some examples, where the network is a wireless network, the network interface device 122 can include one or more transmitting and/or receiving antenna, and suitable radiofrequency circuitry to drive the one or more antenna and interpret signals received from the one or more antenna. Examples of suitable wireless networks can include cellular networks, such as 3G, wireless personal area networks, wireless local area networks, wireless metropolitan area networks, wireless wide area networks, and others. In other examples, the network can be a wired network.

System 100 can include one or more servers 126. For clarity, FIG. 1 shows only a single server 126; in practice, there can be a network of connected servers 126, operating in one or more geographic regions in a city, state, country, or worldwide. In some examples, the one or more servers 126 can be owned and/or operated by the owner and/or operator of the secured terminal 102. In some examples, the one or more servers 126 can be used to assemble and/or aggregate regionwide or worldwide data collected by the field engineers or technicians.

Server 126 can include at least one processor 128. For clarity, FIG. 1 shows only a single processor 128, but it will be readily understood that the server 126 can alternatively include multiple processors 128, and that data processing activities can be divided as needed among one or more of the processors 128.

Server 126 can include at least one memory device 130 storing instructions executable by the at least one processor 128. For clarity, FIG. 1 shows only a single memory device 130, but it will be readily understood that the server 126 can alternatively include multiple memory devices 130, and that storage functions can be divided as needed among one or more of the memory devices 130. The instructions can be executable by the at least one processor 128 to perform data processing activities.

Figure 2:
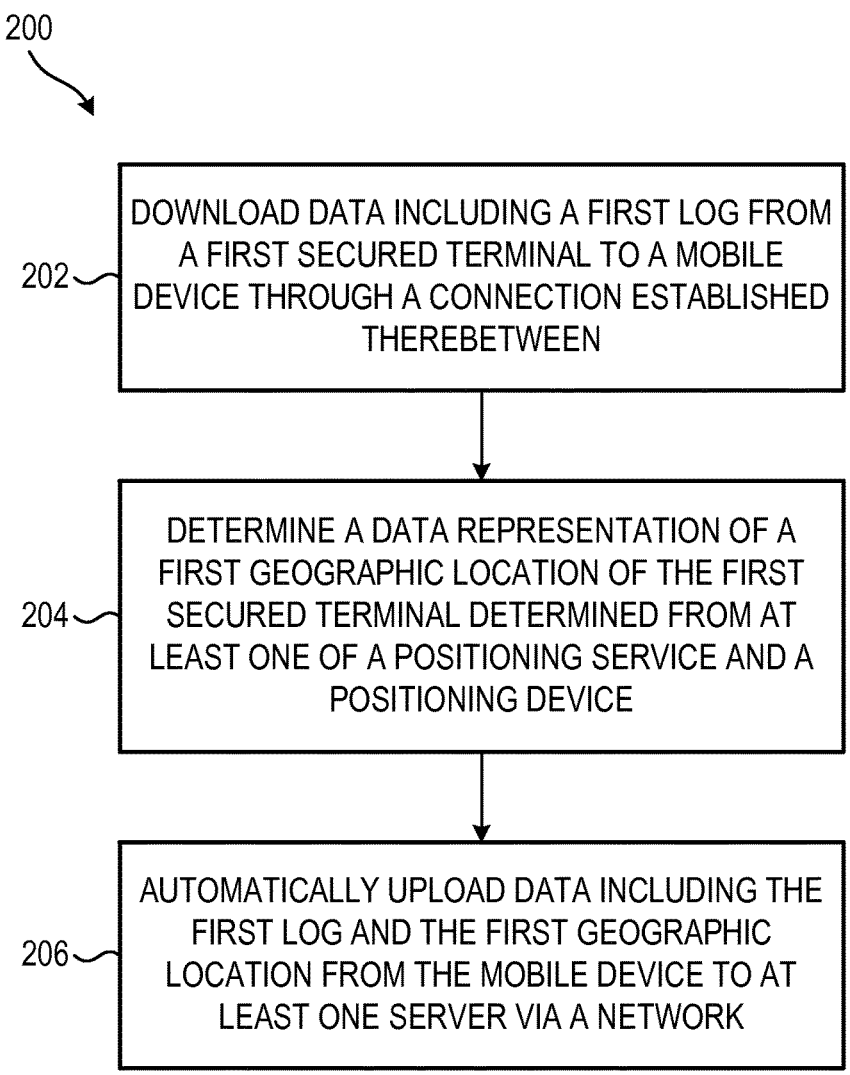
FIG. 2 shows an example of a method for retrieving secured terminal log data, in accordance with some embodiments.

FIG. 2 shows an example of a method 200 for retrieving secured terminal log data, in accordance with some embodiments. The method 200 can be executed on a mobile device, such as 114 (FIG. 1), as well as on other suitable devices. The mobile device can include at least one processor, and at least one memory device storing instructions executable by the at least one processor. The instructions can be executable by the at least one processor to perform data processing activities. The data activities can include operations 202-206 described below. The method 200 of FIG. 2 is but one example; other suitable methods can also be used.

At operation 202, the mobile device can download data including a first log from a first secured terminal to a mobile device through a connection established therebetween. In some examples, the secured terminal can verify a legitimacy of the mobile device, then upload the data to the mobile device. In some examples, the first secured terminal can be an automated teller machine. In some examples, the first secured terminal is connected to a non-public network via a wired connection and is not connected to a wireless network. In some examples, the connection can include a wired port on the first secured terminal.

At operation 204, the mobile device can determine a data representation of a first geographic location of the first secured terminal determined from at least one of a positioning service and a positioning device. In some examples, the positioning device can be a global positioning system module of the mobile device. In some examples, the positioning device can be a beacon device.

In some examples, the data representation of the first geographic location can be associated with configuration data of the first secured terminal accessible to the server. For example, the server can receive the first geographic location from the mobile device. The server can then select the closest secured terminal to the first geographic location, based on a database of known, stored locations of secured terminals.

At operation 206, the mobile device can automatically upload data including the first log and the first geographic location from the mobile device to at least one server via a network. In some examples, the network is a wireless network.

In some examples, the data activities can further include confirming, via data exchanged through the connection, that the mobile device satisfies at least one security protocol.

In some examples, the data activities can further include downloading data including a second log from a second secured terminal to the mobile device through a connection established therebetween, determining a data representation of a second geographic location of the second secured terminal determined from at least one of the positioning service and the positioning device, and automatically uploading data including the second log and the second geographic location from the mobile device to the at least one server via the network. In some of these examples, the data representation of the first and second geographic locations can be associated with configuration data of the first and secured terminals accessible to the server, respectively.

Figure 3:
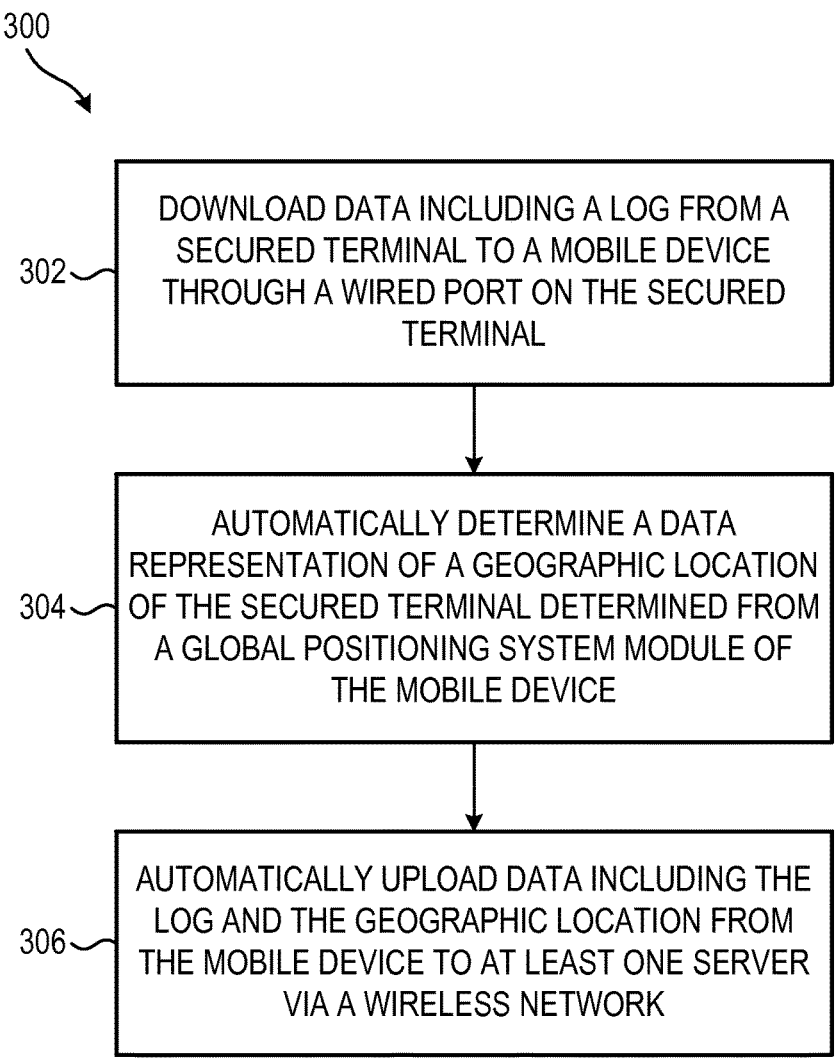
FIG. 3 shows another example of a method for retrieving secured terminal log data, in accordance with some embodiments.

FIG. 3 shows another example of a method 300 for retrieving secured terminal log data, in accordance with some embodiments. The method 300 can be executed on a mobile device, such as 114 (FIG. 1), as well as on other suitable devices. The mobile device can include at least one processor, and at least one memory device storing instructions executable by the at least one processor. The instructions can be executable by the at least one processor to perform data processing activities. The data activities can include operations 302-306 described below. The method 300 of FIG. 3 is but another example; other suitable methods can also be used.

At operation 302, the mobile device can download data including a log from a secured terminal to a mobile device through a wired port on the secured terminal. In some examples, the secured terminal is an automated teller machine. In some examples, the secured terminal is connected to a non-public network via a wired connection and is not connected to a wireless network.

At operation 304, the mobile device can automatically determine a data representation of a geographic location of the secured terminal determined from a global positioning system module of the mobile device. In some examples, the data representation of the geographic location is associated with configuration data of the secured terminal accessible to the server.

At operation 306, the mobile device can automatically upload data including the log and the geographic location from the mobile device to at least one server via a wireless network.

In some examples, the data activities can further include confirming, via data exchanged through the wired port on the secured terminal, that the mobile device satisfies at least one security protocol.

Some embodiments may be implemented in one or a combination of hardware, firmware and software. Embodiments may also be implemented as instructions stored on a computer-readable storage device, which may be read and executed by at least one data processing device to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, checkout terminals may include one or more data processing devices and may be configured with instructions stored on a computer-readable storage device.

What is claimed is:

1. A method, comprising:
downloading data including a first log from a first secured terminal to a mobile device through a connection established therebetween, wherein the first log includes at least one of a transactional detail or an operating condition of the first secured terminal, and wherein the transactional detail includes a failed transaction detail;
receiving information regarding a first geographic location of the first secured terminal from at least one of a positioning service or a positioning device;
automatically determining, from the information received from the at least one of the positioning service or positioning device, a data representation of a first geographic location of the first secured terminal, wherein the data representation includes a coordinate of the first secured terminal; and
automatically uploading data including the first log and the first geographic location from the mobile device to at least one server via a network.

2. The method of claim 1, wherein the first secured terminal is an automated teller machine.

3. The method of claim 1, wherein the connection comprises a wired port on the first secured terminal.

4. The method of claim 1, wherein the positioning device is a global positioning system module of the mobile device.

5. The method of claim 1, wherein the positioning device is a beacon device.

6. The method of claim 1, wherein the network is a wireless network.

7. The method of claim 1, wherein the data representation of the first geographic location is associated with configuration data of the first secured terminal accessible to the server.

8. The method of claim 1, further comprising:
downloading data including a second log from a second secured terminal to the mobile device through a connection established therebetween;
determining a data representation of a second geographic location of the second secured terminal determined from at least one of the positioning service and the positioning device; and
automatically uploading data including the second log and the second geographic location from the mobile device to the at least one server via the network.

9. The method of claim 8, wherein the data representation of the first and second geographic locations are associated with configuration data of the first and secured terminals accessible to the server, respectively.

10. The method of claim 1, wherein the first secured terminal is connected to a non-public network via a wired connection and is not connected to a wireless network.

11. The method of claim 1, further comprising:
confirming, via data exchanged through the connection, that the mobile device satisfies at least one security protocol.

12. A method, comprising:
downloading data including a log from a secured terminal to a mobile device through a wired port on the secured terminal, wherein the log includes at least one of a transactional detail or an operating condition of the secured terminal, and wherein the transactional detail includes a failed transaction detail;
receiving information regarding a geographic location of the secured terminal from a global positioning system module;
automatically determining, from the information received from global positioning system module, a data representation of a geographic location of the secured terminal, wherein the data representation includes a coordinate of the secured terminal; and automatically uploading data including the log and the geographic location from the mobile device to at least one server via a wireless network.

13. The method of claim 12, wherein the secured terminal is an automated teller machine.

14. The method of claim 12, wherein the data representation of the geographic location is associated with configuration data of the secured terminal accessible to the server.

15. The method of claim 12, wherein the secured terminal is connected to a non-public network via a wired connection and is not connected to a wireless network.

16. The method of claim 12, further comprising:
confirming, via data exchanged through the wired port on the secured terminal, that the mobile device satisfies at least one security protocol.

17. A mobile device, comprising:
a network interface device;
at least one processor; and
at least one memory device storing instructions executable by the at least one processor, the instructions being executable by the at least one processor to perform data processing activities, the data processing activities comprising:
downloading data including a first log from a first secured terminal to a mobile device through a connection established therebetween, wherein the first log includes at least one of a transactional detail or an operating condition of the first secured terminal, and wherein the transactional detail includes a failed transaction detail;

receiving information regarding a first geographic location of the first secured terminal from at least one of a positioning service or a positioning device;

automatically determining from the information received from the at least one of the positioning service or the positioning device, a data representation of a first geographic location of the first secured terminal determined from at least one of a positioning service and a positioning device, wherein the data representation includes a coordinate of the first secured terminal; and automatically uploading data including the first log and the first geographic location from the mobile device to at least one server via a network accessed by the network interface device.

18. The mobile device of claim 17, wherein the connection comprises a wired port on the first secured terminal.

19. The mobile device of claim 17, wherein the positioning device is a global positioning system module of the mobile device.

20. The mobile device of claim 17, wherein the data representation of the first geographic location is associated with configuration data of the first secured terminal accessible to the server.

* * * * *